United States Patent
Matsumoto et al.

(10) Patent No.: US 12,072,243 B2
(45) Date of Patent: Aug. 27, 2024

(54) MONITORING DEVICE, MONITORING METHOD, AND OPTICAL TRANSMISSION SYSTEM

(71) Applicant: NEC Corporation, Tokyo (JP)

(72) Inventors: Keiichi Matsumoto, Tokyo (JP); Hidemi Noguchi, Tokyo (JP); Emmanuel Le Taillandier De Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 106 days.

(21) Appl. No.: 17/797,843

(22) PCT Filed: Feb. 15, 2021

(86) PCT No.: PCT/JP2021/005514
§ 371 (c)(1),
(2) Date: Aug. 5, 2022

(87) PCT Pub. No.: WO2021/172069
PCT Pub. Date: Sep. 2, 2021

(65) Prior Publication Data
US 2023/0026901 A1    Jan. 26, 2023

(30) Foreign Application Priority Data
Feb. 27, 2020    (JP) .................................. 2020-031289

(51) Int. Cl.
*G01K 11/3206*    (2021.01)
*G02B 6/02*    (2006.01)

(52) U.S. Cl.
CPC ...... *G01K 11/3206* (2013.01); *G02B 6/02042* (2013.01)

(58) Field of Classification Search
CPC ............ G01K 11/3206; G02B 6/02042; H04B 10/07955; H04J 14/04
See application file for complete search history.

(56) References Cited

U.S. PATENT DOCUMENTS

| | | | |
|---|---|---|---|
| 11,349,564 B2* | 5/2022 | Isoda ................. | H04B 10/0775 |
| 2018/0337726 A1 | 11/2018 | Oda et al. | |
| 2020/0056958 A1* | 2/2020 | Hasegawa .......... | G01M 11/3145 |

FOREIGN PATENT DOCUMENTS

| | | | |
|---|---|---|---|
| JP | 2016-225899 A | 12/2016 | |
| JP | 2017-022638 A | 1/2017 | |

(Continued)

OTHER PUBLICATIONS

International Search Report for PCT Application No. PCT/JP2021/005514, mailed on Apr. 27, 2021.

(Continued)

*Primary Examiner* — John Bedtelyon

(57) ABSTRACT

Provided are a monitoring device, a monitoring method, and an optical transmission system which are adapted for an increase in the number of cores of a multi-core optical fiber transmission path and suitable for crosstalk monitoring. The monitoring device monitors a multi-core optical fiber transmission path having a plurality of use cores and at least one or more non-use cores, and comprises: an applying means for applying, at a start point of the multi-core optical fiber transmission path, dithering to signal light propagating in the use cores; a monitoring means for monitoring the power of the non-use cores at an input side of a relay in the multi-core optical fiber transmission path; and a separating means for separating a monitoring result from the monitoring means into power components from the plurality of use cores.

19 Claims, 10 Drawing Sheets

(56) References Cited

FOREIGN PATENT DOCUMENTS

| WO | 2013/179604 A1 | 12/2013 |
| WO | 2017/090616 A1 | 6/2017 |
| WO | 2017/145629 A1 | 8/2017 |
| WO | 2018/207915 A1 | 11/2018 |

OTHER PUBLICATIONS

English translation of Written opinion for PCT Application No. PCT/JP2021/005514, mailed on Apr. 27, 2021.

* cited by examiner

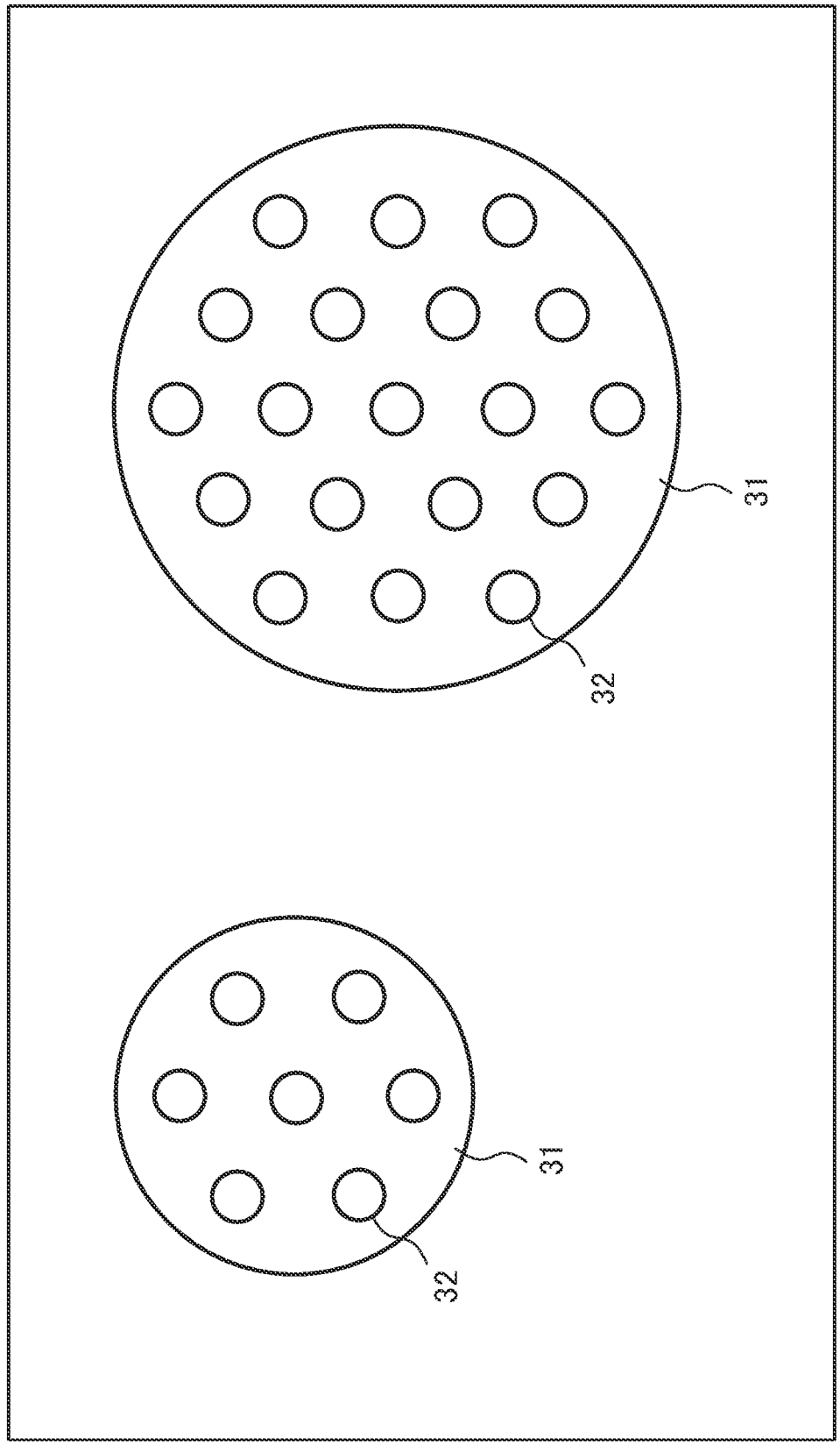

MONITORING DEVICE, MONITORING METHOD, AND OPTICAL TRANSMISSION SYSTEM

This application is a National Stage Entry of PCT/JP2021/005514 filed on Feb. 15, 2021, which claims priority from Japanese Patent Application 2020-031289 filed on Feb. 27, 2020, the contents of all of which are incorporated herein by reference, in their entirety.

TECHNICAL FIELD

The present invention relates to a monitoring device, a monitoring method, and an optical transmission system, and particularly relates to crosstalk monitoring of a multi-core optical fiber transmission path.

BACKGROUND ART

As an optical fiber amplifier that amplifies signal intensity of an optical signal, there is an optical fiber amplifier that amplifies signal intensity of an optical signal by inputting, to a rare-earth additive fiber to which the optical signal is input, pumping light being output from a pumping light source. For example, a structure in which erbium (Er) as one example of a rare-earth element is added to a core portion of a fiber is known.

An optical fiber amplifier being used in a band of 1.55 µm being a low-loss wavelength region in optical fiber communication has a structure in which erbium is added to a core portion of a fiber, activates an erbium ion in an optical fiber by pumping light in a band of 0.98 µm or 1.48 µm, uses laser transition in a band of 1.55 µm of erbium, and sufficiently amplifies signal light in a band of 1.55 µm by semiconductor laser diode pumping.

Since an optical fiber amplifier has high efficiency and high gain, and gain is almost independent of polarization, the optical fiber amplifier is used as an amplifier for optical signal relay in an optical fiber communication system. In the optical fiber communication system, a wavelength division multiplexing (WDM) transmission technique for multiplexing a plurality of wavelengths in order to achieve large-capacity communication is adopted, and an amplifier collectively amplifies all channels.

Further, in recent years, a space division multiplexing (SDM) transmission technique has been discussed in order to achieve larger-capacity communication, and transmission using a multi-core optical fiber including a plurality of cores in one clad has been studied. In the SDM transmission technique, it has been discussed that signal light propagating through each core of a multi-core optical fiber is amplified by a core-individual pumping method of supplying pumping light to each core, or a clad-collective pumping method of causing pumping light to enter a clad around a core and supplying the pumping light to all the cores collectively.

In transmission using a multi-core optical fiber including a plurality of cores in one clad, a measure against crosstalk due to light leaking from another core in the multi-core optical fiber is needed. The crosstalk becomes more conspicuous with design in which the number of cores in a multi-core optical fiber is increased or with design in which a pitch between cores in a multi-core optical fiber is reduced in order to achieve larger-capacity communication.

CITATION LIST

Patent Literature

[PTL1] International Publication No. WO2017/145629

SUMMARY OF INVENTION

Technical Problem

However, the measure in the background art described above against crosstalk between cores of an optical transmission system using a multi-core optical fiber has the following problem.

When a configuration for monitoring output light intensity by providing an optical power monitor for each core of a multi-core optical fiber, and recognizing crosstalk of an optical signal propagating through a core in response to a monitoring result is adopted, the number of monitoring parts and the like increases in proportion to the number of cores. As the number of cores of a multi-core optical fiber is increased in order to achieve larger-capacity communication, a problem of an increase in the number of parts becomes more conspicuous.

For example, when an optical transmission system using a multi-core optical fiber is used as an optical submarine cable system, the monitoring part described above is disposed on a submarine repeater. Since space saving is required for the repeater in the optical submarine cable system, a requirement for space saving that is essential for the submarine repeater is hampered when an optical power monitor is provided for each core of a multi-core optical fiber as in the background art.

An object of the present invention is to provide a monitoring device, a monitoring method, and an optical transmission system that are able to handle an increase in core number of a multi-core optical fiber transmission path and are suitable for crosstalk monitoring.

Solution to Problem

In order to achieve the object described above, a monitoring device according to the present invention is a monitoring device of a multi-core optical fiber transmission path including a plurality of used cores and at least one or more non-used cores, and includes:
  an application means for applying dither to signal light propagating through the used core at a starting point of the multi-core optical fiber transmission path;
  a monitoring means for monitoring power of the non-used core on an input side of a repeater of the multi-core optical fiber transmission path; and
  a separation means for separating a monitoring result of the monitoring means into a power component from the plurality of used cores.

An optical transmission system according to the present invention includes:
  a multi-core optical fiber transmission path including a plurality of used cores and at least one or more non-used cores; and
  a repeater to be inserted into the multi-core optical fiber transmission path, wherein
  the repeater includes the monitoring means of the monitoring device.

A monitoring method according to the present invention is a monitoring method of a multi-core optical fiber transmission path including a plurality of used cores and at least one or more non-used cores, and includes:

applying dither to signal light propagating through the used core at a starting point of the multi-core optical fiber transmission path;

monitoring power of the non-used core on an input side of a repeater of the multi-core optical fiber transmission path; and separating the monitoring result into a power component from the plurality of used cores.

Advantageous Effects of Invention

According to the present invention, a monitoring device, a monitoring method, and an optical transmission system that are able to handle an increase in core number of a multi-core optical fiber transmission path and are suitable for crosstalk monitoring can be provided.

BRIEF DESCRIPTION OF DRAWINGS

FIG. 8A is a cross-sectional view for describing a relationship between a clad and a core of a multi-core optical fiber transmission path when each core is disposed in a hexagonal close-packed arrangement.

EXAMPLE EMBODIMENT

Preferable example embodiments of the present invention will be described in detail with reference to drawings.

An "unused core" used in description in the specification refers to a core that is not currently used for propagation of an optical signal by a multi-core optical fiber transmission path among cores present in a multi-core optical fiber in which a plurality of cores are formed in one clad. Further, an unused core can be referred to as a "non-used core" having an exclusive meaning from a used core being used for propagation of an optical signal by a multi-core optical fiber transmission path.

First Example Embodiment

First, a monitoring device and a monitoring method according to a first example embodiment of the present invention will be described.

Figure 1:
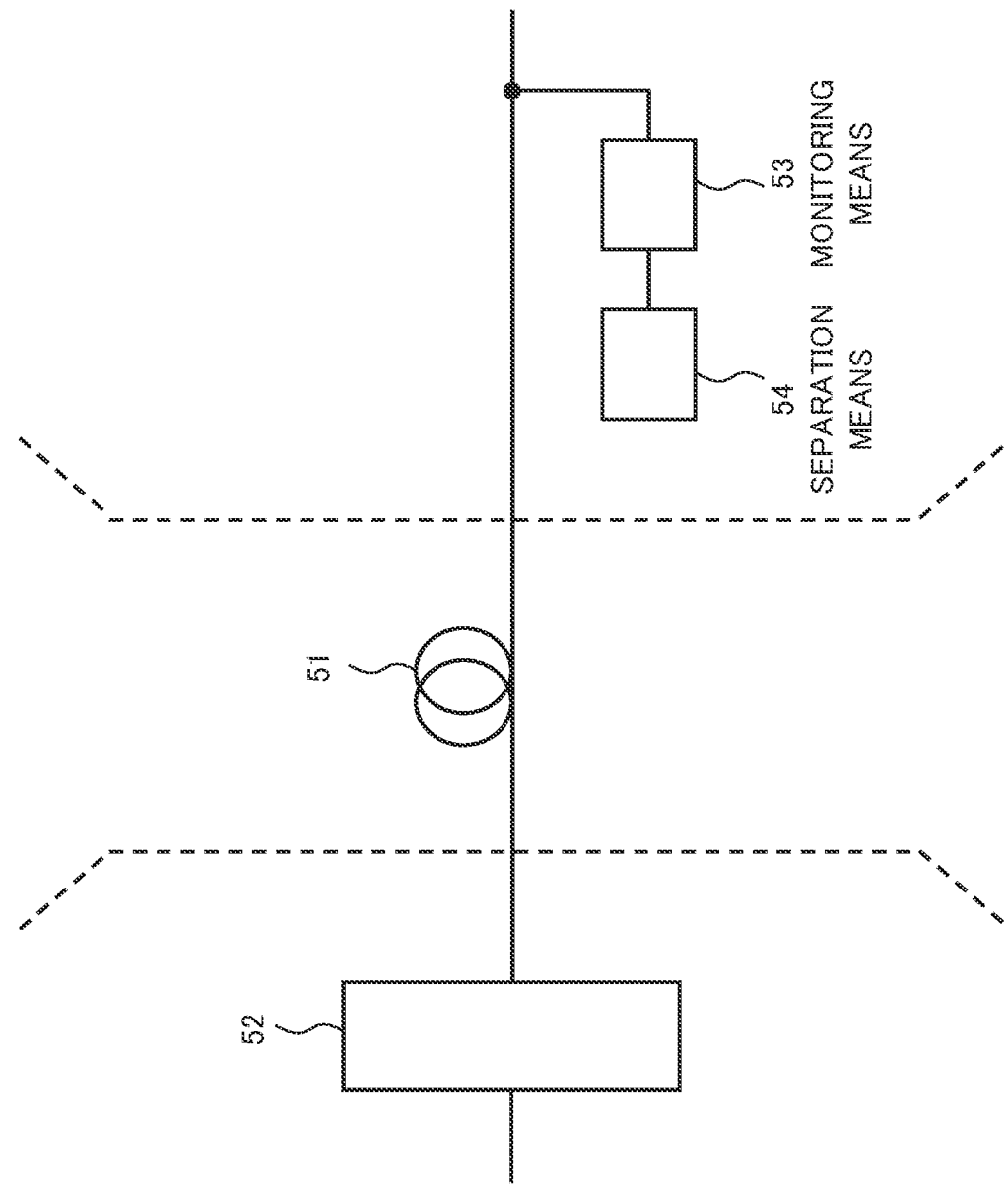
FIG. 1 is a block diagram for describing a monitoring device according to a first example embodiment of the present invention.

FIG. 1 is a block diagram for describing the monitoring device according to the first example embodiment of the present invention.

The monitoring device according to the first example embodiment is a monitoring device for a multi-core optical fiber transmission path using a multi-core optical fiber including a plurality of cores in one clad. An assumed scene is an optical transmission system for transmitting an optical signal via a multi-core optical fiber, and the monitoring device in FIG. 1 is a monitoring device of a multi-core optical fiber transmission path 51 including a plurality of used cores and at least one or more unused cores. Furthermore, the monitoring device in FIG. 1 includes an application means 52 for applying dither to the used core, a monitoring means 53 for monitoring power of the unused core, and a separation means 54 for separating a monitoring result of the monitoring means 53 into a power component from the plurality of used cores.

The application means 52 applies dither information to an optical signal propagating through a core of the multi-core optical fiber transmission path 51. The monitoring means 53 and the separation means 54 are included in, for example, a repeater, and recognize crosstalk of the optical signal propagating through the core of the multi-core optical fiber transmission path 51. The dither information applied to a used core by the application means 52 is used for separation into a power component by the separation means 54. The monitoring means 53 monitors power of an unused core of the multi-core optical fiber transmission path 51 located downstream of the application means 52. The separation means 54 separates a monitoring result of the monitoring means 53 into a power component from the plurality of used cores by using the applied dither information.

A component in which an optical signal propagating through a core in one clad leaks outside the core causes crosstalk for an optical signal propagating through another core. There are classifications of coupling multi-core optical fibers and non-coupling multi-core optical fibers, but a measure against crosstalk between cores is desired regardless of a classification of a coupling or non-coupling multi-core optical fiber. In the present example embodiment, power of an unused core of a multi-core optical fiber is monitored. A component in which an optical signal propagating through each core in one clad leaks outside each core is reflected in the monitored power of the unused core. Separation into a power component from the plurality of used cores is performed by using dither information applied to an optical signal propagating through a core of a multi-core optical fiber, and information related to power of the plurality of used cores in one clad is acquired.

According to the present example embodiment, a monitoring device and a monitoring method that can handle an increase in core number of a multi-core optical fiber transmission path and are suitable for crosstalk monitoring can be achieved. The reason is that, even when a monitoring part is not disposed for each used core of a multi-core optical fiber as in the background art, information related to power of a plurality of used cores can be acquired.

Second Example Embodiment

Figure 2:
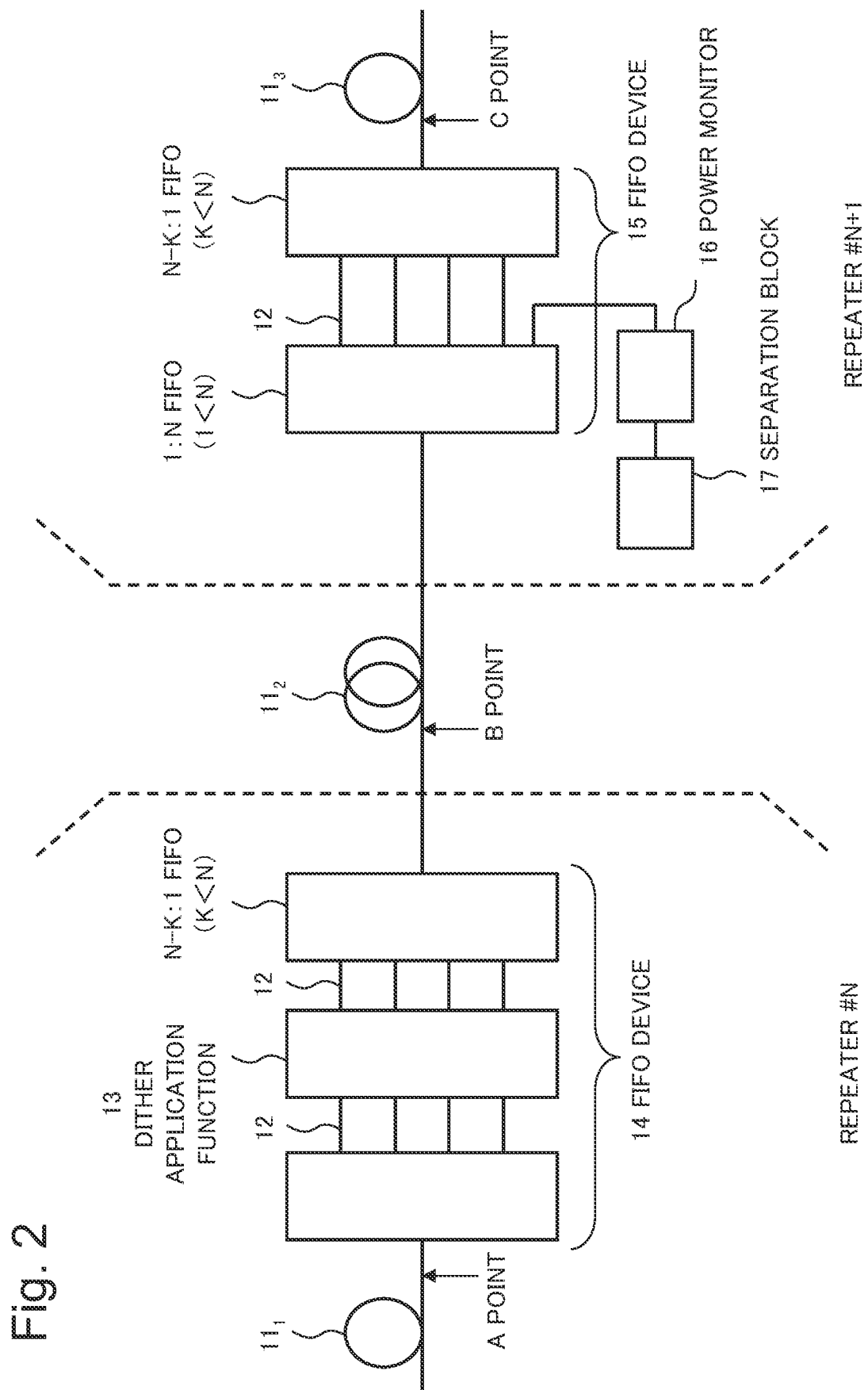
FIG. 2 is a block diagram for describing a monitoring device and an optical transmission system according to a second example embodiment of the present invention.

Next, a monitoring device, a monitoring method, and an optical transmission system according to a second example embodiment of the present invention will be described. FIG. 2 is a block diagram for describing the monitoring device and the optical transmission system according to the second example embodiment of the present invention.

Figure 3A:
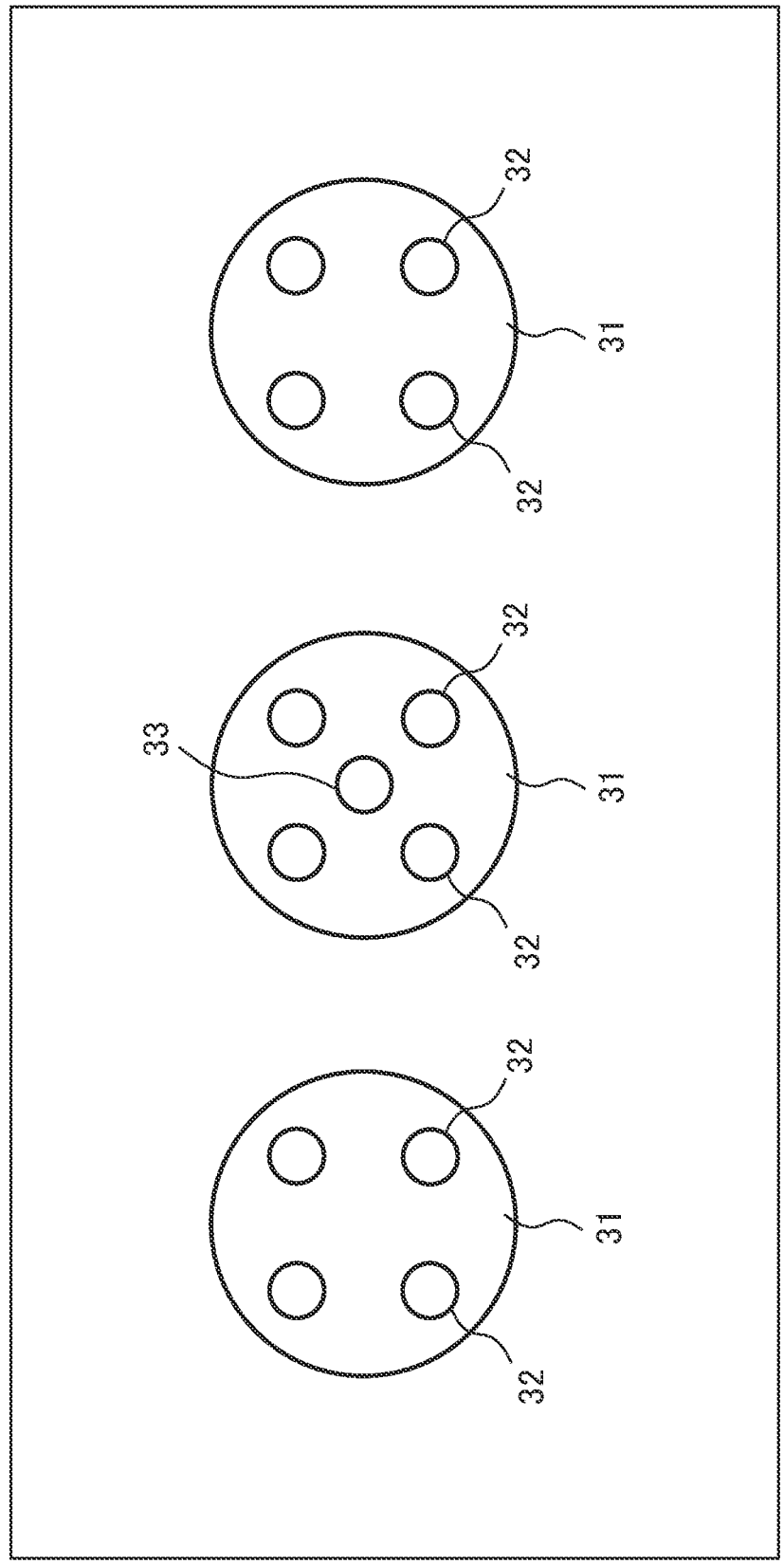
FIG. 3A is a cross-sectional view for describing one example of a configuration of a multi-core optical fiber of a multi-core optical fiber transmission path in FIG. 2.

FIG. 3A is a cross-sectional view for describing a configuration of a multi-core optical fiber of a multi-core optical fiber transmission path in FIG. 2.

The present example embodiment relates to the monitoring device and the monitoring method acquired by further embodying the monitoring device and the monitoring method according to the first example embodiment described above, and relates to the optical transmission system to which the monitoring device and the monitoring method are applied.

The monitoring device according to the second example embodiment is a monitoring device for a multi-core optical fiber transmission path using a multi-core optical fiber including a plurality of cores in one clad. An assumed scene for use of the present example embodiment is an optical transmission system for transmitting an optical signal via a multi-core optical fiber, and, for example, a repeater #N (note that N is a natural number of one or more) and a repeater #N+1 (note that N is a natural number of one or more) are configured to be coupled to each other with a multi-core optical fiber transmission path. The monitoring device in FIG. 2 is a monitoring device of a multi-core optical fiber transmission path $11_2$ including a plurality of used cores and at least one or more unused cores. Furthermore, the monitoring device in FIG. 2 includes a dither application function 13 of applying dither to the used core, a power monitor 16 that monitors power of the unused core, and a separation block 17 that separates a monitoring result of the power monitor 16 into a power component from the plurality of used cores. In the present example embodiment, the dither application function 13 is included in the repeater #N, and the power monitor 16 and the separation block 17 are included in the repeater #N+1.

The monitoring device according to the second example embodiment is a monitoring device for a multi-core optical fiber transmission path using a multi-core optical fiber including a plurality of cores in one clad. The monitoring device included in FIG. 2 is a monitoring device for an optical signal propagating through multi-core optical fiber transmission paths $11_1$, $11_2$, and $11_3$ including a plurality of used cores and at least one or more unused cores.

Note that, in the present example embodiment, as one example, description is given on an assumption that a core number of the multi-core optical fiber transmission path $11_1$ is four, a core number of the multi-core optical fiber transmission path $11_2$ is five including a monitoring-specific core, and a core number of the multi-core optical fiber transmission path $11_3$ is four, but a core number of a multi-core optical fiber transmission path to which the present invention can be applied is not limited thereto. A cross-sectional view of the multi-core optical fiber transmission paths $11_1$, $11_2$, and $11_3$ at an A point, a B point, and a C point in FIG. 2 is illustrated in FIG. 3A. Four cores 32 are disposed in a square arrangement in a clad 31 in the multi-core optical fiber transmission path $11_1$ in FIG. 3A, the four cores 32 are disposed in a square arrangement in a clad 31 and an unused core disposed at the center is also used as a monitoring-specific core 33 in the multi-core optical fiber transmission path $11_2$, and the four cores 32 are disposed in a square arrangement in the clad 31 in the multi-core optical fiber transmission path $11_3$. FIG. 3A illustrates an arrangement of a representative core of a multi-core optical fiber transmission path including a plurality of cores in one clad, but an arrangement of cores is not limited thereto.

In the present example embodiment, a fan-in/fan-out device (FIFO device) is used as a specific configuration for applying dither to a used core of a multi-core optical fiber transmission path, and as a specific configuration for using an unused core of a multi-core optical fiber transmission path as a monitoring-specific core (for monitoring power of an unused core). A FIFO device 14 is inserted between the multi-core optical fiber transmission path $11_1$ and the multi-core optical fiber transmission path $11_2$, and a FIFO device 15 is inserted between the multi-core optical fiber transmission path $11_2$ and the multi-core optical fiber transmission path $11_3$.

The FIFO device 14 includes four single-mode fibers 12, and the dither application function 13 of applying dither to a core of the single-mode fiber 12. The FIFO device 14 splits the multi-core optical fiber transmission path $11_1$ having the core number of four into four single-mode fibers, also causes the dither application function 13 to be able to apply dither to an optical signal propagating through the core of the multi-core optical fiber transmission path $11_1$ for each of the single-mode fibers 12, and further connects the four single-mode fibers 12 to the four cores of the multi-core optical fiber transmission path $11_2$.

The FIFO device 15 includes four single-mode fibers 12. The FIFO device 15 splits the multi-core optical fiber transmission path $11_2$ having the core number of five including the monitoring-specific core into five single-mode fibers 12, and also connects the four single-mode fibers 12 used for propagation of the optical signal to the four cores of the multi-core optical fiber transmission path $11_3$. Power of a single-mode fiber that is the unused core of the multi-core optical fiber transmission path $11_2$ and is associated with the monitoring-specific core in the present example embodiment among the five single-mode fibers 12 split from the FIFO device 15 is provided to the power monitor 16.

Design may be performed in such a way that a coupling portion of the FIFO device 14 to the multi-core optical fiber transmission path $11_2$ functions as N−K: 1 FIFO (K<N), a coupling portion of the FIFO device 15 to the multi-core optical fiber transmission path $11_2$ functions as 1:N FIFO (1<N), and a coupling portion of the FIFO device 15 to the multi-core optical fiber transmission path $11_3$ functions as N−K:1 FIFO (K<N). Here, N is the number of the core of the multi-core optical fiber transmission path $11_2$, N−K is the number of the used core of the multi-core optical fiber transmission path $11_2$, and K is the number of the unused core of the multi-core optical fiber transmission path $11_2$.

The multi-core optical fiber transmission path $11_2$ in FIG. 2 can include an optical fiber amplifier that amplifies signal intensity of an optical signal. As the optical fiber amplifier that amplifies signal intensity of an optical signal, there is an optical fiber amplifier that amplifies signal intensity of an optical signal by inputting, to a rare-earth additive fiber to which the optical signal is input, pumping light output from a pumping light source. For example, a structure in which erbium (Er) as one example of a rare-earth element is added to a core portion of a fiber is known. A multi-core optical fiber transmission path including an optical fiber amplifier serves as an optical amplifier for an optical signal propagating through a multi-core optical fiber.

(Operation)

Hereinafter, an operation of the monitoring device, and the monitoring method according to the present example embodiment will be described. The dither application function 13 applies dither information to an optical signal propagating through a core of a multi-core optical fiber transmission path. The dither information is used for separation into a power component by the separation block 17. The power monitor 16 monitors power of an unused core of the multi-core optical fiber transmission path located downstream of the dither application function 13, which is the multi-core optical fiber transmission path 11$_2$ in FIG. 2. Note that a photoelectric conversion means (not illustrated) for converting an optical signal from an unused core into an electric signal is provided on a prior stage of the power monitor 16, but description thereof will be omitted. The separation block 17 separates a monitoring result of the power monitor 16 into a power component from the plurality of used cores by using the dither information applied by the dither application function 13.

Next, a method of separation into a power component from the plurality of used cores by using dither information will be described. Note that a case where the number of a used core of a multi-core optical fiber is four will also be described here, but the present invention can be applied without being limited to this number.

In a case of a multi-core optical fiber having the number of a used core of N, power $P_{mon}$ of the unused core of the multi-core optical fiber transmission path 11$_2$ monitored by the power monitor 16 in the present example embodiment can be expressed as $P_1X_1+P_2X_2+P_3X_3+ \ldots +P_NX_N=P_{mon}$. Here, it is assumed that $P_1$, $P_2$, $P_3$, ..., and $P_N$ indicate intensity of light leaking from a used core (used core 1, used core 2, used core 3, ..., and used core N), and $X_1$, $X_2$, $X_3$, ..., and $X_N$ reflect an intrinsic coefficient determined by a design specification of a multi-core optical fiber such as a pitch between the used core (used core 1, used core 2, used core 3, ..., and used core N) and the unused core with respect to intensity of a propagating optical signal.

In a case of a configuration as illustrated in FIG. 2 in which the number of the used core of the multi-core optical fiber is four, the power $P_{mon}$ of the unused core of the multi-core optical fiber transmission path 11$_2$ monitored by the power monitor 16 can be expressed as $P_1X_1+P_2X_2+P_3X_3+P_4X_4=P_{mon}$. Here, it is assumed that $P_1$ to $P_4$ indicate intensity of light leaking from the used core (used core 1 to used core 4), and $X_1$ to $X_4$ reflect an intrinsic coefficient determined by a design specification of a multi-core optical fiber such as a pitch between the used core (used core 1 to used core 4) and the unused core with respect to intensity of a propagating optical signal.

The dither information applied by the dither application function 13 is identification information for separating a monitoring result of the power monitor 16 into a power component from the plurality of used cores.

In the present example embodiment, dither having fixed intensity is provided to signal light incident on a plurality of used cores of a multi-core optical fiber. It is assumed that the dither having the fixed intensity in the present example embodiment is dither having a frequency of about 1 kHz different for each of the plurality of used cores, and having the same amplitude. Note that, the monitoring device in the present example embodiment is used for an optical fiber amplifier that amplifies signal intensity of an optical signal by inputting, to a rare-earth additive fiver to which the optical signal is input, pumping light output from a pumping light source, the frequency of the dither is set to be slow to an extent that an amplification medium can respond.

Figure 4:
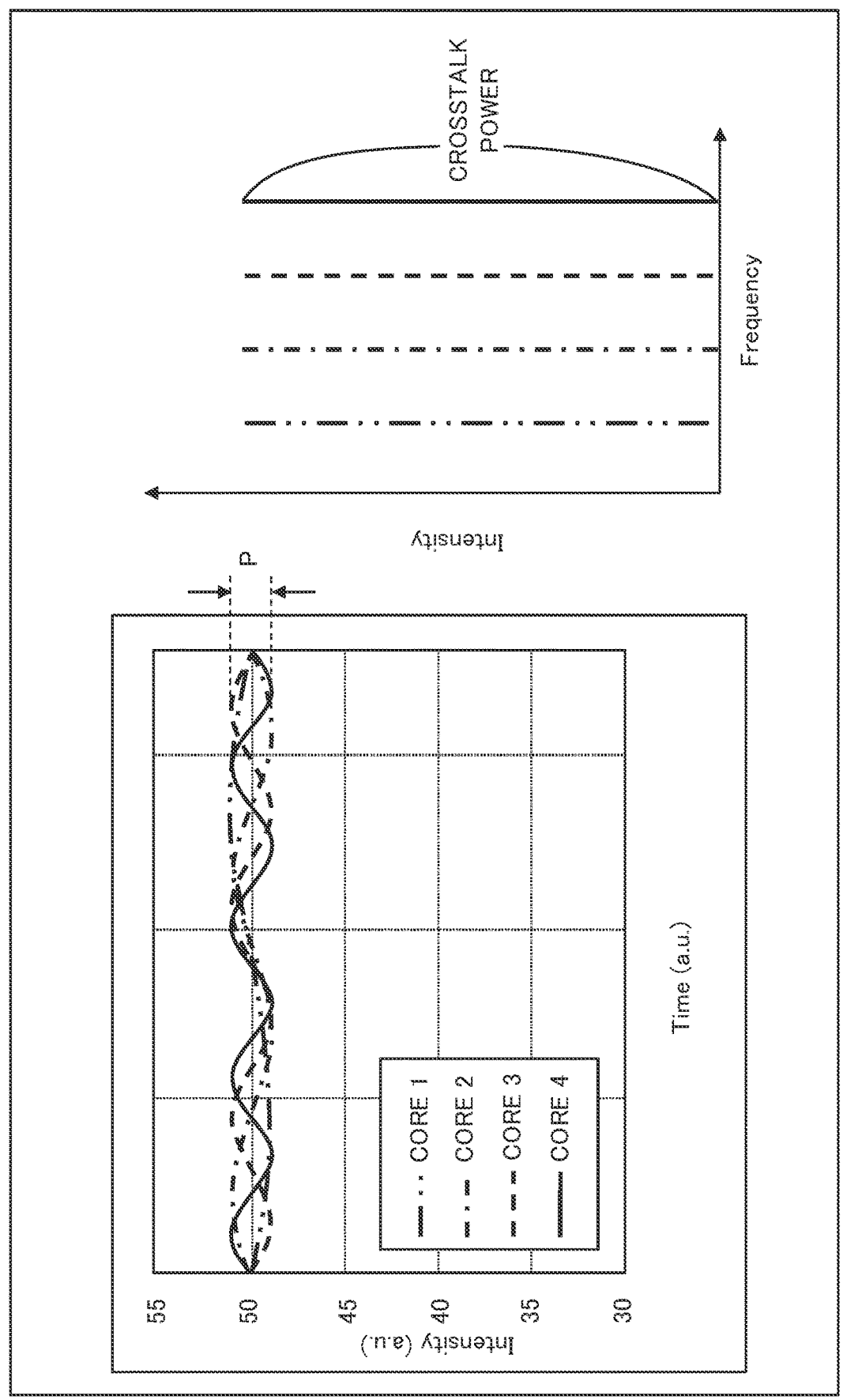
FIG. 4 is a graph illustrating a relationship between time and intensity of signal light when dither having a different frequency and fixed intensity is provided to a plurality of used cores, and a relationship between a frequency of the dither component and intensity associated with an amplitude of the dither component.

FIG. 4 is a graph illustrating a relationship between time and intensity of signal light when dither having a different frequency and fixed intensity is provided to a used core 1 to a used core 4, and a relationship between a frequency of the dither component and intensity associated with an amplitude of the dither component. The dither having a different frequency and being provided for each of a plurality of used cores is identification information that identifies the plurality of used cores.

For the sake of description, FIG. 4 indicates information related to the used core 1 by a chain double-dashed line, information related to the used core 2 by a dot-and-dash line, information related to the used core 3 by a dotted line, and information related to the used core 4 by a solid line. For example, it is assumed that dither provided to the used core 1 is a sinusoidal wave of 1 kHz, dither provided to the used core 2 is a sinusoidal wave of 2 kHz, dither provided to the used core 3 is a sinusoidal wave of 3 kHz, and dither provided to the used core 4 is a sinusoidal wave of 4 kHz, and an amplitude P thereof is the same.

In the graph illustrating light intensity with respect to a frequency in FIG. 4, dither information having fixed intensity is provided, and thus light intensity appears at frequencies different from each other being provided to an optical signal of each used core. In absence of crosstalk between cores, the frequencies are observed as peaks having the same magnitude. When dither provided to the used core 1 is a sinusoidal wave of 1 kHz, dither provided to the used core 2 is a sinusoidal wave of 2 kHz, dither provided to the used core 3 is a sinusoidal wave of 3 kHz, and dither provided to the used core 4 is a sinusoidal wave of 4 kHz as described above, a peak related to the used core 1, a peak related to the used core 2, a peak related to the used core 3, and a peak related to the used core 4 appear at frequencies of 1 kHz, 2 kHz, 3 kHz, and 4 kHz. In absence of crosstalk between cores, magnitude of the peaks is the same, and thus an influence of the crosstalk can be recognized from a difference when the magnitude is not the same.

Note that, as dither having a different frequency and being provided as identification information that identifies a plurality of used cores, dither having a frequency lower than a response frequency of an amplification medium of an optical amplifier is selected in consideration of a combination with the optical amplifier. By selecting such a frequency, identification information remains in an optical signal passing through an amplification medium of an optical amplifier, and a plurality of used cores can be identified.

(Effect of Example Embodiment)

According to the present example embodiment, similarly to the first example embodiment described above and the like, the monitoring device and the monitoring method that can handle an increase in core number of a multi-core optical fiber transmission path and are suitable for crosstalk monitoring can be achieved.

In the present example embodiment, dither having fixed intensity is provided to signal light incident on a plurality of used cores of a multi-core optical fiber. A dither amplitude is observed in the power monitor 16 that monitors power of an unused core. Since the amplitude P of dither having a different frequency and being provided for each of a plurality of used cores is fixed, a relationship between a frequency and light intensity is fixed when there is no time fluctuation in crosstalk. A change in the relationship between a frequency and light intensity represents a time fluctuation in crosstalk, and a crosstalk amount can be determined in such a manner.

In the present example embodiment, when a time fluctuation is caused by a change in an environment in which a multi-core optical fiber transmission path to be monitored operates, such as a temperature change and a stress change, for example, crosstalk can also be monitored.

Patent Literature 1 (PTL1) relates to a crosstalk measurement of a multi-core fiber, and proposes that power of crosstalk light is estimated by causing light to enter one core of a multi-core fiber via a dummy fiber, measuring power of reference light emitted from the core, and then capturing crosstalk light emitted from a core different from the core that the light enters while the reference light is masked, and the like. However, since a measurement of power of reference light, capturing of crosstalk light, and the like are performed in a crosstalk measurement of a multi-core fiber as proposed in PTL1, estimation of power of the crosstalk light can be performed only before operation of an optical transmission system using the multi-core fiber, whereas in the present example embodiment, when a time fluctuation is caused by a change in an environment in which a multi-core optical fiber transmission path to be monitored operates, such as a temperature change and a stress change, for example, crosstalk can also be monitored.

Furthermore, in the optical transmission system to which the monitoring device and the monitoring method according to the present example embodiment are applied, similarly to the second example embodiment described above and the like, even when a monitoring part is not disposed for each used core of a multi-core optical fiber as in the background art, information related to power of a plurality of used cores can be acquired, and thus space saving can be achieved.

Third Example Embodiment

Figure 5:
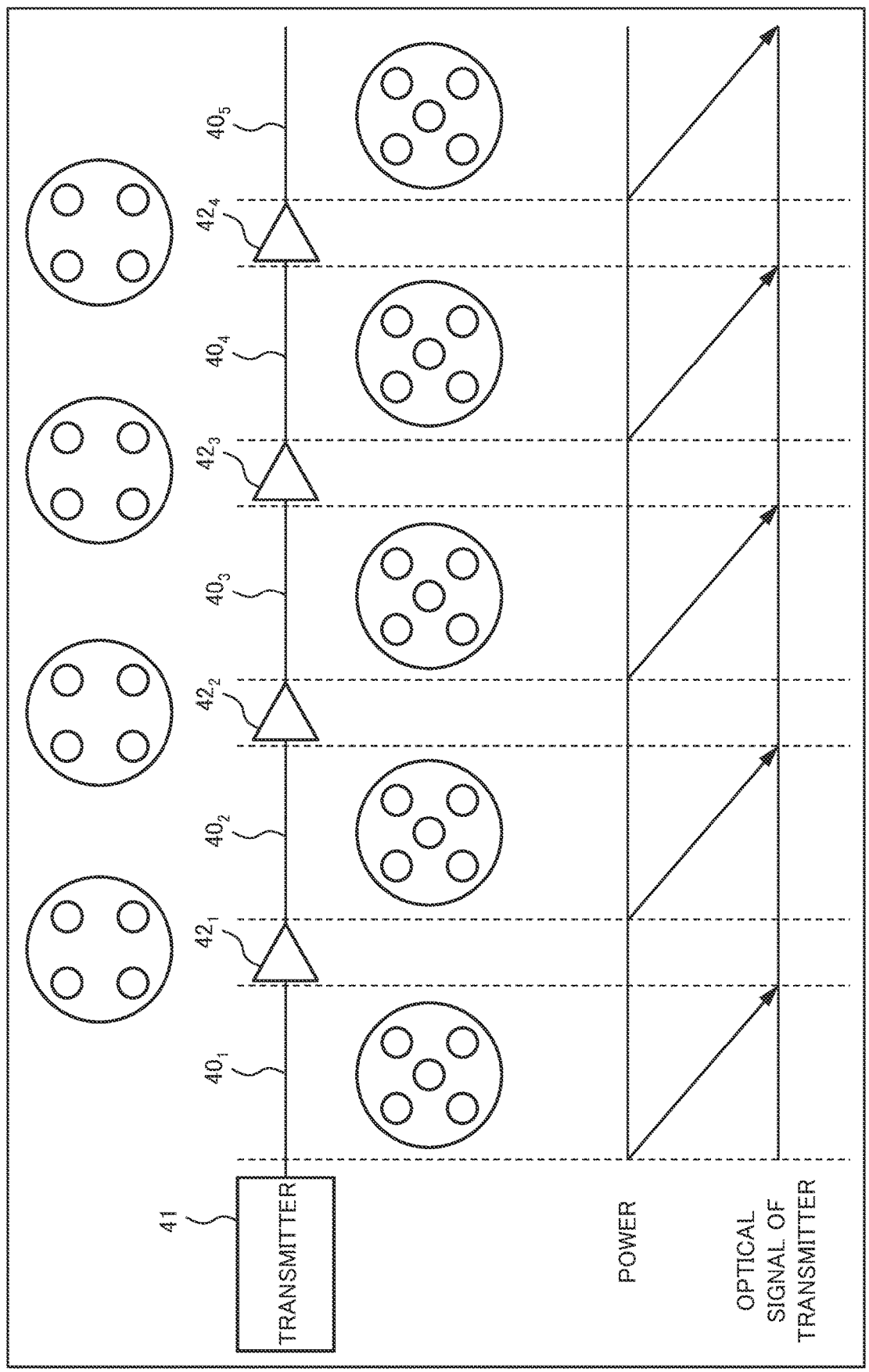
FIG. 5 is a block diagram for describing a monitoring device and a monitoring method according to a third example embodiment of the present invention.
Figure 6:
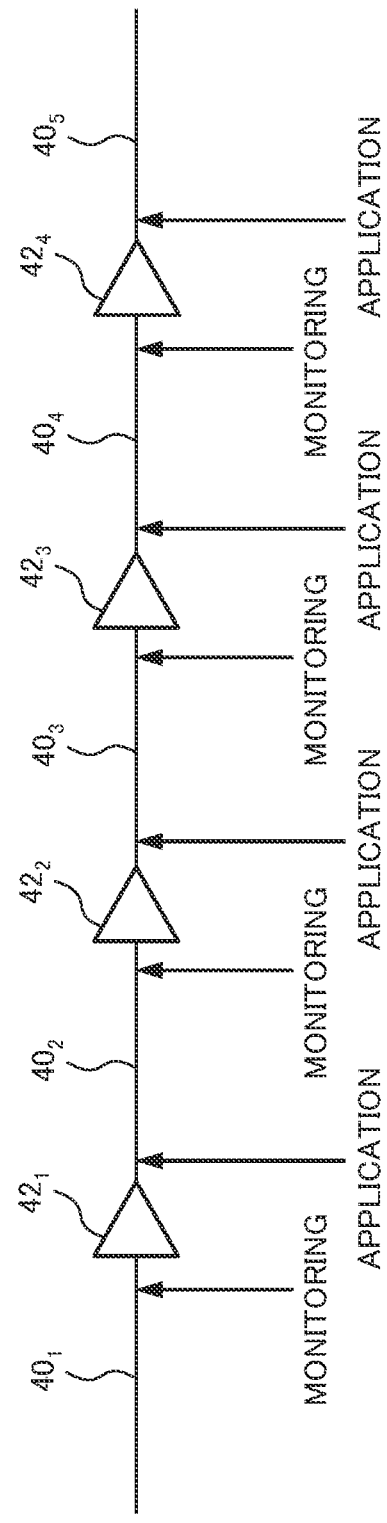
FIG. 6 is a schematic diagram for describing the monitoring device and the monitoring method according to the third example embodiment of the present invention.

Next, a monitoring device and a monitoring method according to a third example embodiment of the present invention will be described. FIG. 5 is a block diagram for describing the monitoring device and the monitoring method according to the third example embodiment of the present invention. FIG. 6 is a schematic diagram for describing the monitoring device and the monitoring method according to the third example embodiment of the present invention.

The present example embodiment relates to application of the present invention to an optical transmission system formed of a plurality of repeaters and a plurality of multi-core optical fibers. The optical transmission system constitutes an optical transmission system by terminal stations on land being connected to each other with an optical submarine cable, for example. One terminal station includes a transmitter 41 that transmits an optical signal to an optical submarine cable. Furthermore, a plurality of repeaters $42_1$, $42_2$, $42_3$, $42_4$, . . . are disposed on the optical submarine cable. The transmitter 41 and the repeater $42_1$, and adjacent repeaters are connected with multi-core optical fibers $40_1$, $40_2$, $40_3$, $40_4$, $40_5$, . . . . Each of the repeaters $42_1$, $42_2$, $42_3$, $42_4$, . . . includes an optical amplifier that amplifies an optical signal by being provided with an operation power source from a feeding line in parallel with a core that propagates the optical signal. As the optical fiber amplifier that amplifies signal intensity of an optical signal, there is an optical fiber amplifier that amplifies signal intensity of an optical signal by inputting, to a rare-earth additive fiber to which the optical signal is input, pumping light output from a pumping light source. For example, an amplification medium having a structure in which erbium (Er) as one example of a rare-earth element is added to a core portion of a fiber is known.

In the present example embodiment, as each cross section is illustrated in FIG. 5, it is assumed that the multi-core optical fibers $40_1$, $40_2$, $40_3$, $40_4$, $40_5$, . . . included in a transmission path have a configuration in which four used cores are disposed in a square arrangement in one clad, and a monitoring-specific core is disposed at the center. Then, it is assumed that the amplification medium that is included in each of the repeaters $42_k$, $42_2$, $42_3$, $42_4$, . . . and amplifies an optical signal has a configuration in which four used cores are disposed in a square arrangement in one clad.

In a case of the configuration in FIG. 5, an optical signal transmitted from the transmitter 41 propagates through the used cores of the multi-core optical fiber $40_1$ disposed in the square arrangement, and reaches the repeater $42_1$. At an output of the transmitter 41, i.e., an input end of the multi-core optical fiber $40_1$, dither information in the example embodiment described above is applied to each of the used cores as in FIG. 6, and then an output of an optical signal that propagates through the multi-core optical fiber $40_1$ and is applied with the dither information is monitored by monitoring, as in FIG. 6, the monitoring-specific core of the multi-core optical fiber $40_1$ at an input end of the repeater $42_1$. Since the monitoring-specific core of the multi-core optical fiber $40_1$ is not coupled to the amplification medium of the repeater $42_1$, amplification of the optical signal by the repeater $42_1$ is not affected. Further, since the monitoring-specific core is not coupled to the amplification medium of the repeater $42_1$, the optical signal is not output from an output end of the repeater $42_1$ to the multi-core optical fiber $40_2$ ahead of the output end.

Furthermore, in a case of the configuration in FIG. 5, an optical signal transmitted from the repeater $42_1$ to the multi-core optical fiber $40_2$ propagates through the used cores of the multi-core optical fiber $40_2$ disposed in the square arrangement, and reaches the repeater $42_2$. At the output end of the repeater $42_1$, i.e., an input end of the multi-core optical fiber $40_2$, dither information in the example embodiment described above is applied to each of the used cores as in FIG. 6, and then an output of an optical signal that propagates through the multi-core optical fiber $40_2$ and is applied with the dither information is monitored by monitoring, as in FIG. 6, the monitoring-specific core of the multi-core optical fiber $40_2$ at an input end of the repeater $42_2$. Since the monitoring-specific core of the multi-core optical fiber $40_2$ is not coupled to the amplification medium of the repeater $42_2$, amplification of the optical signal by the repeater $42_2$ is not affected. Further, since the monitoring-specific core is not coupled to the amplification medium of the repeater $42_2$, the optical signal is not output from an output end of the repeater $42_2$ to the multi-core optical fiber $40_3$ ahead of the output end.

Hereinafter, the same also applies to monitoring related to an optical signal transmitted from the repeater $42_2$ to the multi-core optical fiber $40_3$, an optical signal transmitted from the repeater $42_3$ to the multi-core optical fiber $40_4$, and an optical signal transmitted from the repeater $42_4$ to the multi-core optical fiber $40_5$.

By adopting such a configuration, crosstalk of a multi-core optical fiber can be individually monitored for each section of the multi-core optical fibers $40_1$, $40_2$, $40_3$, $40_4$, $40_5$, . . . included in one transmission path. Furthermore, by adopting such a configuration, monitoring of crosstalk of a multi-core optical fiber in a certain section included in one transmission path does not affect monitoring of crosstalk of the multi-core optical fiber in another section. In other words, by adopting such a configuration, crosstalk of any multi-core optical fiber transmission path between repeaters being included in one transmission path can be monitored.

[Fourth Example Embodiment]

Figure 7:
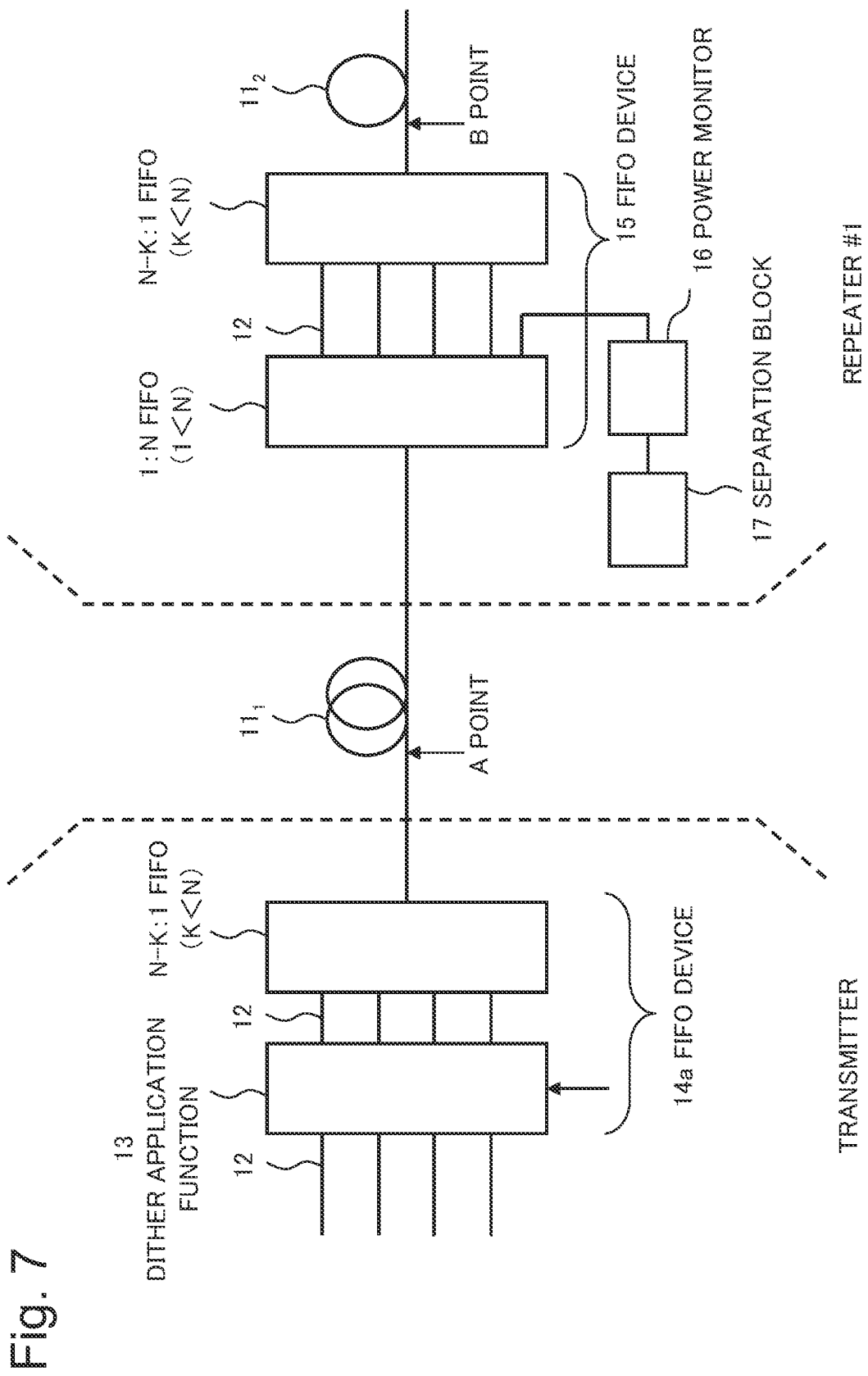
FIG. 7 is a block diagram for describing the monitoring device and an optical transmission system according to a fourth example embodiment of the present invention.

Next, a monitoring device, a monitoring method, and an optical transmission system according to a fourth example embodiment of the present invention will be described. FIG. 7 is a block diagram for describing the monitoring device and the optical transmission system according to the fourth example embodiment of the present invention. A configuration similar to that in the second example embodiment is provided with same reference sign, and the detailed description thereof will be omitted.

The present example embodiment relates to the monitoring device and the monitoring method acquired by further embodying the monitoring device and the monitoring method according to the first example embodiment described above, and relates to the optical transmission system to which the monitoring device and the monitoring method are applied.

Similarly to the example embodiment described above, the monitoring device according to the fourth example embodiment is a monitoring device for a multi-core optical fiber transmission path using a multi-core optical fiber including a plurality of cores in one clad. An assumed scene for use of the present example embodiment is an optical transmission system for transmitting an optical signal via a multi-core optical fiber, and, for example, a terminal station and a repeater (repeater #1) are configured to be coupled to each other with a multi-core optical fiber transmission path. The monitoring device in FIG. 7 is a monitoring device of a multi-core optical fiber transmission path $11_1$ including a plurality of used cores and at least one or more unused cores. Furthermore, similarly to the second example embodiment, the monitoring device in FIG. 7 includes a dither application function 13 of applying dither to the used core, a power monitor 16 that monitors power of the unused core, and a separation block 17 that separates a monitoring result of the power monitor 16 into a power component from the plurality of used cores. In the present example embodiment, the dither application function 13 is included in a transmitter of the terminal station, and the power monitor 16 and the separation block 17 are included in the repeater #1.

In the present example embodiment, a fan-in/fan-out device (FIFO device) is used as a specific configuration for applying dither to a used core of a multi-core optical fiber transmission path, and as a specific configuration for using an unused core of a multi-core optical fiber transmission path as a monitoring-specific core (for monitoring power of an unused core). The transmitter of the terminal station is provided with a FIFO device 14a, and the repeater #1 is provided with a FIFO device 15.

The FIFO device 14a includes four single-mode fibers 12, and the dither application function 13 of applying dither to a core of the single-mode fiber 12. The FIFO device 14a causes the dither application function 13 to be able to apply, for each of the single-mode fibers 12, dither to be transmitted from the terminal station, and further connects the four single-mode fibers 12 to four cores of the multi-core optical fiber transmission path $11_1$.

The FIFO device 15 includes four single-mode fibers 12. The FIFO device 15 splits the multi-core optical fiber transmission path $11_1$ having the core number of five including the monitoring-specific core into five single-mode fibers 12, and also connects the four single-mode fibers 12 used for propagation of the optical signal to four cores of a multi-core optical fiber transmission path $11_2$. Power of a single-mode fiber that is the unused core of the multi-core optical fiber transmission path $11_1$ and is associated with the monitoring-specific core in the present example embodiment among the five single-mode fibers 12 split from the FIFO device 15 is provided to the power monitor 16.

(Effect of Example Embodiment)

According to the present example embodiment, similarly to the first example embodiment described above and the like, the monitoring device and the monitoring method that can handle an increase in core number of a multi-core optical fiber transmission path and are suitable for crosstalk monitoring can be achieved.

Similarly to the second example embodiment, in the present example embodiment, dither having fixed intensity is provided to signal light incident on a plurality of used cores of a multi-core optical fiber. A dither amplitude is observed in the power monitor 16 that monitors power of an unused core. Since an amplitude P of dither having a different frequency and being provided for each of a plurality of used cores is fixed, a relationship between a frequency and light intensity is fixed when there is no time fluctuation in crosstalk. A change in the relationship between a frequency and light intensity represents a time fluctuation in crosstalk, and a crosstalk amount can be determined in such a manner.

In the present example embodiment, when a time fluctuation is caused by a change in an environment in which a multi-core optical fiber transmission path to be monitored operates, such as a temperature change and a stress change, for example, crosstalk can also be monitored.

Furthermore, in the optical transmission system to which the monitoring device and the monitoring method according to the present example embodiment are applied, similarly to the second example embodiment described above and the like, even when a monitoring part is not disposed for each used core of a multi-core optical fiber as in the background art, information related to power of a plurality of used cores can be acquired, and thus space saving can be achieved.

Other Example Embodiment

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The second example embodiment described above and the like describe a case where dither information applied by the dither application function 13 as identification information for separating a monitoring result of the power monitor 16 into a power component from the plurality of used cores is dither having fixed intensity and a different frequency, but the identification information for separation into a power component from a plurality of used cores according to the present invention is not limited thereto. For example, as dither information applied by the dither application function 13, it is conceivable to use dither having fixed intensity, the same frequency, and a different phase. A monitoring result of the power monitor 16 can also be separated into a power component from the plurality of used cores, based on a difference in phase.

Note that, when the monitoring device in the present example embodiment is used for an optical fiber amplifier that amplifies signal intensity of an optical signal by inputting, to a rare-earth additive fiver to which the optical signal is input, pumping light output from a pumping light source, the frequency of the dither is set to be slow to an extent that an amplification medium can respond. In other words, as dither having the same frequency and a different phase and being provided as identification information that identifies a plurality of used cores, dither having a frequency lower than a response frequency of an amplification medium of an optical amplifier is selected in consideration of a combination with the optical amplifier. By selecting such a frequency, identification information remains in an optical signal passing through an amplification medium of an optical amplifier, and the remaining identification information can be used for identification of a plurality of used cores.

Figure 3B:
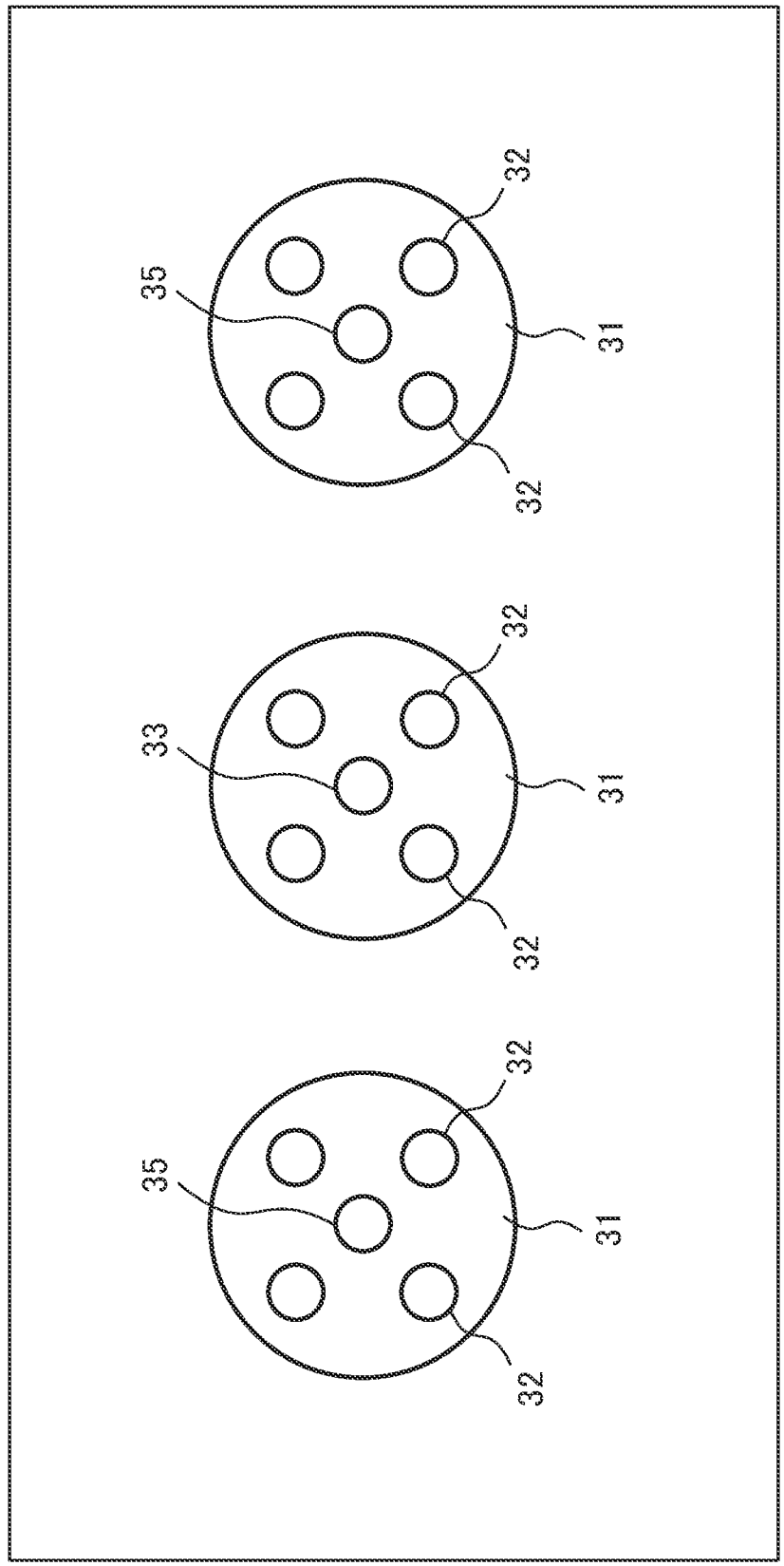
FIG. 3B is a cross-sectional view for describing another example of a configuration of the multi-core optical fiber of the multi-core optical fiber transmission path in FIG. 2.

Further, in the second example embodiment described above, with reference to FIG. 2, description is given on an assumption that a core number of the multi-core optical fiber transmission path $11_1$ is four, a core number of the multi-core optical fiber transmission path $11_2$ is five including a monitoring-specific core, and a core number of the multi-core optical fiber transmission path $11_3$ is four, but a core number of a multi-core optical fiber transmission path to which the present invention can be applied is not limited thereto. For example, as illustrated in FIG. 3B, a configuration in which a core number of the multi-core optical fiber transmission path $11_1$ is five including an unused core that is not even used as a monitoring-specific core, a core number of the multi-core optical fiber transmission path $11_2$ is five including a monitoring-specific core, and a core number of the multi-core optical fiber transmission path $11_3$ is five including an unused core that is not even used as a monitoring-specific core is conceivable. In this case, particularly the monitoring-specific core of the multi-core optical fiber transmission path $11_2$ may be configured not to be coupled to the unused core of the multi-core optical fiber transmission path $11_3$.

Further, a core number of a multi-core optical fiber transmission path to which the present invention can be applied is not limited to that in FIG. 3A. FIG. 8A is a cross-sectional view for describing a relationship between a clad and a core of a multi-core optical fiber transmission path when each core is disposed in a hexagonal close-packed arrangement.

Figure 8B:
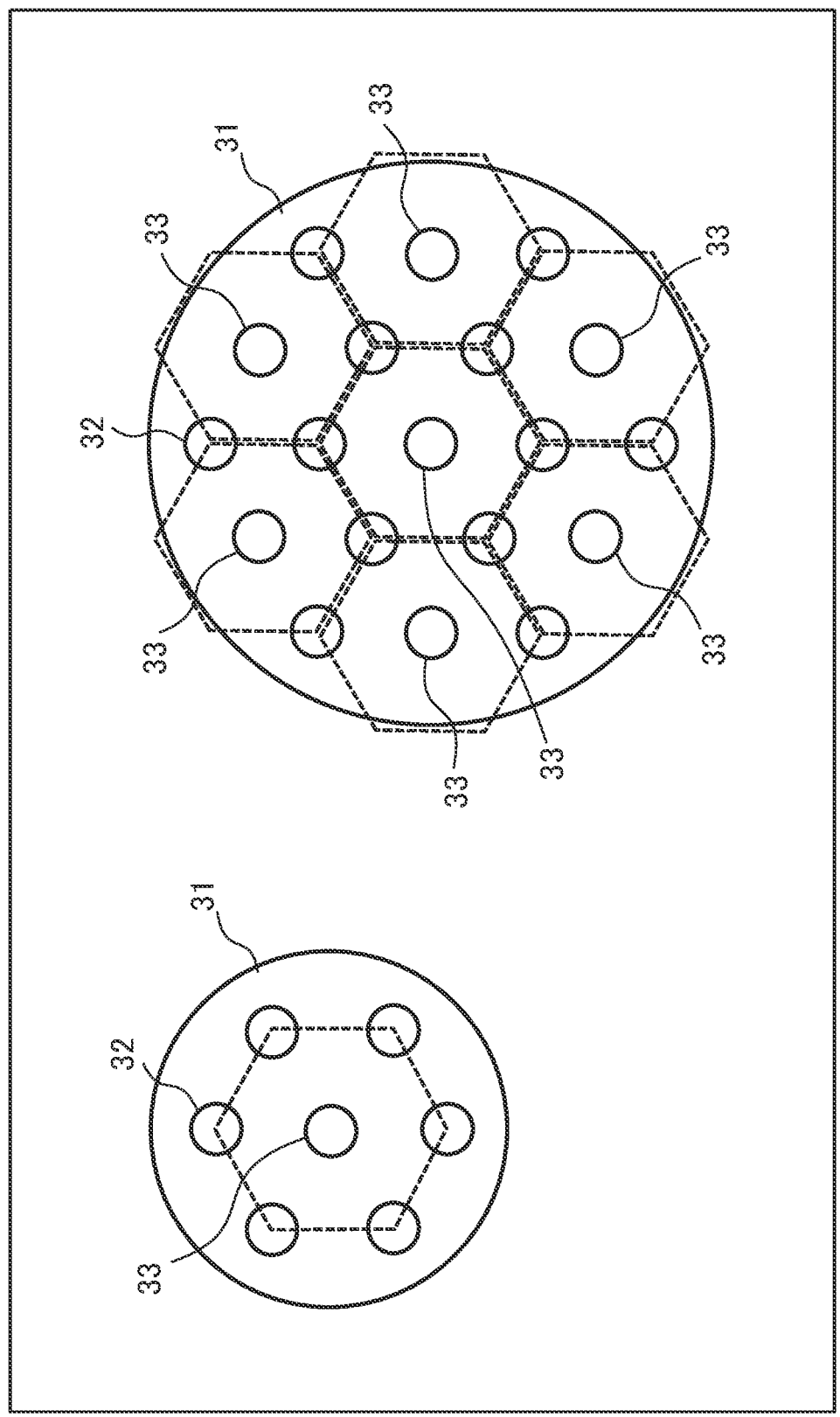
FIG. 8B is a cross-sectional view for describing a way of thinking of an arrangement of a monitoring-specific core of the multi-core optical fiber transmission path in FIG. 8A.

FIG. 8B is a cross-sectional view for describing a way of thinking of an arrangement of a monitoring-specific core of the multi-core optical fiber transmission path in FIG. 8A. The drawing on the left side in FIG. 8A illustrates a cross section of the multi-core optical fiber transmission path in which seven cores 32 are disposed in a clad 31, and the drawing on the right side in FIG. 8A illustrates a cross section of the multi-core optical fiber transmission path in which 19 cores 32 are disposed in the clad 31.

In a case of the arrangement on the left side in FIG. 8A, it is conceivable to use the six outer cores 32 as cores that propagate an optical signal, and use the core at the center as a monitoring-specific core 33 according to the example embodiment of the present invention as in the cross-sectional view on the left side in FIG. 8B. Furthermore, in a case of the arrangement on the left side in FIG. 8A, it is conceivable to use the six cores 32 as cores that propagate an optical signal, and use the core at the center as the monitoring-specific core 33 according to the example embodiment of the present invention as in the cross-sectional view on the right side in FIG. 8B, on an assumption that the cross-sectional view on the left side in FIG. 8B is one repetitive unit and is disposed in a honeycomb pattern in the multi-core optical fiber transmission path. Further, one unit repeated in a honeycomb pattern in one clad is not limited to the structure in the hexagonal close-packed arrangement, and may be recognized as a structure in a square arrangement as in FIG. 3A.

A part or the whole of the above-described example embodiments may also be described as in supplementary notes below, which is not limited thereto.

(Supplementary Note 1)

A monitoring device of a multi-core optical fiber transmission path including a plurality of used cores and at least one or more non-used cores, the monitoring device including:

an application means for applying dither to signal light propagating through the used core at a starting point of the multi-core optical fiber transmission path;

a monitoring means for monitoring power of the non-used core on an input side of a repeater of the multi-core optical fiber transmission path; and a separation means for separating a monitoring result of the monitoring means into a power component from the plurality of used cores.

(Supplementary Note 2)

The monitoring device according to supplementary note 1, wherein the application means for applying the dither is a signal output unit of the repeater.

(Supplementary Note 3)

The monitoring device according to supplementary note 1, wherein the application means for applying the dither is a signal transmission unit of a terminal station.

(Supplementary Note 4)

The monitoring device according to any one of supplementary notes 1 to 3, wherein the application means superimposes identification information on signal light propagating through the plurality of used cores, and the separation means performs separation into a power component from the plurality of used cores by referring to identification information superimposed on the signal light.

(Supplementary Note 5)

The monitoring device according to supplementary note 4, wherein the identification information includes dither at a first frequency being superimposed on signal light propagating through a first used core among the plurality of used cores, and dither at a second frequency having a frequency different from the first frequency and being superimposed on signal light propagating through a second used core among the plurality of used cores.

(Supplementary Note 6)

The monitoring device according to supplementary note 5, wherein the separation means performs separation into a power component from the plurality of used cores by referring to a difference in frequency between the first frequency and the second frequency.

(Supplementary Note 7)

The monitoring device according to supplementary note 4, wherein the identification information includes dither at a first frequency being superimposed on signal light propagating through a first used core among the plurality of used cores, and dither at a third frequency having a same frequency as the first frequency and a different phase and being superimposed on signal light propagating through a second used core among the plurality of used cores.

(Supplementary Note 8)

The monitoring device according to supplementary note 7, wherein the separation means performs separation into a power component from the plurality of used cores by referring to a difference in phase between the first frequency and the third frequency.

(Supplementary Note 9)

The monitoring device according to any one of supplementary notes 4 to 8, wherein crosstalk of one used core among the plurality of used cores is determined from a monitoring result of the monitoring means by using the identification information superimposed on signal light propagating through the used core.

(Supplementary Note 10)

An optical transmission system including:
  a multi-core optical fiber transmission path including a plurality of used cores and at least one or more non-used cores; and
  the repeater to be inserted into the multi-core optical fiber transmission path, wherein
  the repeater includes the monitoring means of the monitoring device according to any one of supplementary notes 1 to 4.

(Supplementary Note 11)

The optical transmission system according to supplementary note 10, wherein the plurality of used cores are disposed in a square arrangement or a hexagonal close-packed arrangement, and the non-used core whose power is monitored is disposed at a center of the plurality of used cores.

(Supplementary Note 12)

An optical transmission system including:
  a multi-core optical fiber transmission path including a plurality of used cores and at least one or more non-used cores; and
  a plurality of repeaters to be inserted into the multi-core optical fiber transmission path, wherein
  each of the plurality of repeaters includes a plurality of used cores,
  the plurality of used cores of at least one repeater among the plurality of repeaters are each connected to the plurality of used cores of the multi-core optical fiber transmission path including the plurality of used cores and at least one or more non-used cores, and
  the at least one repeater includes the monitoring means of the monitoring device according to any one of supplementary notes 1 to 4.

(Supplementary Note 13)

The optical transmission system according to supplementary note 12, further including a terminal station that transmits an optical signal to the plurality of used cores of the multi-core optical fiber transmission path.

(Supplementary Note 14)

A monitoring method of a multi-core optical fiber transmission path including a plurality of used cores and at least one or more non-used cores, the monitoring method including:
  applying dither to signal light propagating through the used core at a starting point of the multi-core optical fiber transmission path;
  monitoring power of the non-used core on an input side of a repeater of the multi-core optical fiber transmission path; and
  separating a monitoring result of monitoring power of the non-used core into a power component from the plurality of used cores.

(Supplementary Note 15)

The monitoring method according to supplementary note 14, further including:
  superimposing identification information on signal light propagating through the plurality of used cores, in application of the dither; and
  performing separation into a power component from the plurality of used cores by referring to identification information superimposed on the signal light, in separation into the power component.

(Supplementary Note 16)

The monitoring method according to supplementary note 15, wherein the identification information includes dither at a first frequency being superimposed on signal light propagating through a first used core among the plurality of used cores, and dither at a second frequency having a frequency different from the first frequency and being superimposed on signal light propagating through a second used core among the plurality of used cores.

(Supplementary Note 17)

The monitoring method according to supplementary note 16, further including performing separation into a power component from the plurality of used cores by referring to a difference in frequency between the first frequency and the second frequency, in separation into the power component.

(Supplementary Note 18)

The monitoring method according to supplementary note 15, wherein the identification information includes dither at a first frequency being superimposed on signal light propagating through a first used core among the plurality of used cores, and dither at a third frequency having a same frequency as the first frequency and a different phase and being superimposed on signal light propagating through a second used core among the plurality of used cores.

(Supplementary Note 19)

The monitoring method according to supplementary note 18, further including performing separation into a power component from the plurality of used cores by referring to a difference in phase between the first frequency and the third frequency, in separation into the power component.

(Supplementary Note 20)

The monitoring method according to any one of supplementary notes 15 to 19, further including determining crosstalk of one used core among the plurality of used cores from the monitoring result by using the identification information superimposed on signal light propagating through the used core.

(Supplementary Note 21)

The monitoring method according to any one of supplementary notes 15 to 20, wherein the plurality of used cores are disposed in a square arrangement or a hexagonal close-packed arrangement, and the non-used core whose power is monitored is disposed at a center of the plurality of used cores.

This application is based upon and claims the benefit of priority from Japanese patent application No. 2020-31289, filed on Feb. 27, 2020, the disclosure of which is incorporated herein in its entirety by reference.

REFERENCE SIGNS LIST $11_1$, $11_2$, $11_3$ Multi-core optical fiber transmission path
12 Single-mode fiber
13 Dither application function
14, 14a, 15 FIFO device
16 Power monitor
17 Separation block

What is claimed is:

1. A monitoring device of a multi-core optical fiber transmission path including a plurality of used cores and at least one or more non-used cores, the monitoring device comprising:
an application unit that applies dither to signal light propagating through the used core at a starting point of the multi-core optical fiber transmission path;
a monitoring unit that monitors power of the non-used core on an input side of a repeater of the multi-core optical fiber transmission path; and
a separation unit that separates a monitoring result of the monitoring unit into a power component from the plurality of used cores.

2. The monitoring device according to claim 1, wherein the application unit that applies the dither is a signal output unit of the repeater.

3. The monitoring device according to claim 1, wherein the application unit that applies the dither is a signal transmission unit of a terminal station.

4. The monitoring device according to claim 1, wherein
the application superimposes identification information on signal light propagating through the plurality of used cores, and
the separation unit performs separation into a power component from the plurality of used cores by referring to identification information superimposed on the signal light.

5. The monitoring device according to claim 4, wherein the identification information includes dither at a first frequency being superimposed on signal light propagating through a first used core among the plurality of used cores, and dither at a second frequency having a frequency different from the first frequency and being superimposed on signal light propagating through a second used core among the plurality of used cores.

6. The monitoring device according to claim 5, wherein the separation means unit performs separation into the power component from the plurality of used cores by referring to a difference in frequency between the first frequency and the second frequency.

7. The monitoring device according to claim 4, wherein the identification information includes dither at a first frequency being superimposed on signal light propagating through a first used core among the plurality of used cores, and dither at a third frequency having a same frequency as the first frequency and a different phase and being superimposed on signal light propagating through a second used core among the plurality of used cores.

8. The monitoring device according to claim 7, wherein the separation unit performs separation into the power component from the plurality of used cores by referring to a difference in phase between the first frequency and the third frequency.

9. The monitoring device according to claim 4, wherein crosstalk of one used core among the plurality of used cores is determined from a monitoring result of the monitoring unit by using the identification information superimposed on signal light propagating through the used core.

10. An optical transmission system comprising:
a multi-core optical fiber transmission path including a plurality of used cores and at least one or more non-used cores; and
one or more repeaters to be inserted into the multi-core optical fiber transmission path, wherein
each of the one or more repeaters includes a plurality of used cores,
the plurality of used cores of at least one repeater among the one or more repeaters are each connected to the plurality of used cores of the multi-core optical fiber transmission path including the plurality of used cores and the at least one or more non-used cores, and
the at least one repeater includes a monitoring unit that monitors power of the non-used core on an input side of the at least one repeater.

11. The optical transmission system according to claim 10, wherein the plurality of used cores are disposed in a square arrangement or a hexagonal close-packed arrangement, and the non-used core having the power that is monitored is disposed at a center of the plurality of used cores.

12. The optical transmission system according to claim 10, further comprising a terminal station that transmits an optical signal to the plurality of used cores of the multi-core optical fiber transmission path.

13. A monitoring method of a multi-core optical fiber transmission path including a plurality of used cores and at least one or more non-used cores, the monitoring method comprising:
applying dither to signal light propagating through the used core at a starting point of the multi-core optical fiber transmission path;
monitoring power of the non-used core on an input side of a repeater of the multi-core optical fiber transmission path; and
separating a monitoring result of monitoring power of the non-used core into a power component from the plurality of used cores.

14. The monitoring method according to claim 13, further comprising:
superimposing identification information on signal light propagating through the plurality of used cores, in application of the dither; and
performing separation into a power component from the plurality of used cores by referring to identification information superimposed on the signal light, in separation into the power component.

15. The monitoring method according to claim 14, wherein the identification information includes dither at a first frequency being superimposed on signal light propagating through a first used core among the plurality of used cores, and dither at a second frequency having a frequency different from the first frequency and being superimposed on signal light propagating through a second used core among the plurality of used cores.

16. The monitoring method according to claim 15, further comprising performing separation into the power component from the plurality of used cores by referring to a difference in frequency between the first frequency and the second frequency, in separation into the power component.

17. The monitoring method according to claim 14, wherein the identification information includes dither at a first frequency being superimposed on signal light propagating through a first used core among the plurality of used cores, and dither at a third frequency having a same frequency as the first frequency and a different phase and being superimposed on signal light propagating through a second used core among the plurality of used cores.

18. The monitoring method according to claim 17, further comprising performing separation into the power component from the plurality of used cores by referring to a difference in phase between the first frequency and the third frequency, in separation into the power component.

19. The monitoring method according to claim 14, further comprising determining crosstalk of one used core among the plurality of used cores from the monitoring result by using the identification information superimposed on signal light propagating through the used core.

* * * * *